United States Patent
Li et al.

(10) Patent No.: US 10,056,940 B2
(45) Date of Patent: Aug. 21, 2018

(54) POWER ADJUSTMENT DEVICE AND METHOD

(71) Applicant: Huawei Technologies Co., Ltd., Shenzhen (CN)

(72) Inventors: Hao Li, Shenzhen (CN); Ying Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 147 days.

(21) Appl. No.: 15/167,628

(22) Filed: May 27, 2016

(65) Prior Publication Data

US 2016/0277069 A1 Sep. 22, 2016

Related U.S. Application Data

(63) Continuation of application No. PCT/CN2013/087960, filed on Nov. 27, 2013.

(51) Int. Cl.
*H04B 3/32* (2006.01)
*H04M 3/34* (2006.01)
(Continued)

(52) U.S. Cl.
CPC .............. *H04B 3/32* (2013.01); *H04B 3/487* (2015.01); *H04L 1/0001* (2013.01);
(Continued)

(58) Field of Classification Search
None
See application file for complete search history.

(56) References Cited

U.S. PATENT DOCUMENTS

| 7,706,434 B1 | 4/2010 | Farjadrad et al. |
| 2008/0192813 A1* | 8/2008 | Stolle .............. H04B 3/32 375/222 |

(Continued)

FOREIGN PATENT DOCUMENTS

| CN | 101567864 A | 10/2009 |
| CN | 103141033 A | 6/2013 |

(Continued)

OTHER PUBLICATIONS

Ginis et al., "Vectored Transmission for Digital Subscriber Line Systems," IEEE Journal on Selected Areas in Communications, vol. 20, Issue 5, pp. 1085-1104, Institute of Electrical and Electronics Engineers, New York, New York (Jun. 2002).

(Continued)

*Primary Examiner* — Kodzovi Acolatse
(74) *Attorney, Agent, or Firm* — Leydig, Voit & Mayer, Ltd.

(57) ABSTRACT

Embodiments of the present invention relate to a power adjustment device and method. A vectoring control entity VCE provided by embodiments of the present invention includes: a downlink FEXT determining module, configured to determine a power value of downlink FEXT caused to a signal on a line corresponding to a port i by a signal on a line corresponding to a port j, and a receive power value of an FTU-R corresponding to the port i; and a downlink receive power adjustment module, configured to: when the port i is activated, determine, according to the two power values determined by the downlink FEXT determining module, a virtual power margin corresponding to the port i and send the virtual power margin to the FTU-R corresponding to the port i.

14 Claims, 8 Drawing Sheets

(51) Int. Cl.
*H04M 11/06* (2006.01)
*H04L 1/00* (2006.01)
*H04L 12/28* (2006.01)
*H04B 3/487* (2015.01)

(52) U.S. Cl.
CPC .......... *H04L 12/2878* (2013.01); *H04M 3/34* (2013.01); *H04M 11/062* (2013.01)

(56) References Cited

U.S. PATENT DOCUMENTS

| | | |
|---|---|---|
| 2012/0082258 A1 | 4/2012 | Nuzman et al. |
| 2012/0106605 A1* | 5/2012 | Ashikhmin ......... H04L 25/0228 375/222 |
| 2013/0136254 A1* | 5/2013 | Lu ............................ H04B 3/32 379/406.08 |
| 2013/0294597 A1* | 11/2013 | Shi ........................ H04L 7/0041 379/406.01 |
| 2014/0307749 A1* | 10/2014 | Liang .................. H04L 27/2601 370/509 |
| 2014/0328442 A1* | 11/2014 | Liu ....................... H04L 7/0079 375/359 |
| 2015/0071336 A1* | 3/2015 | Kerpez ................... H04B 3/32 375/227 |

FOREIGN PATENT DOCUMENTS

| | | |
|---|---|---|
| WO | WO 2008030145 A1 | 3/2008 |
| WO | WO 2010129022 A2 | 11/2010 |

OTHER PUBLICATIONS

"Draft Recommendation ITU-T G.9701," ITU-T Draft, Study Group 15, TD 224 (WP 1/15), Study Period 2013-2016, International Telecommunication Union, Geneva, Switzerland (Dec. 2013).

* cited by examiner

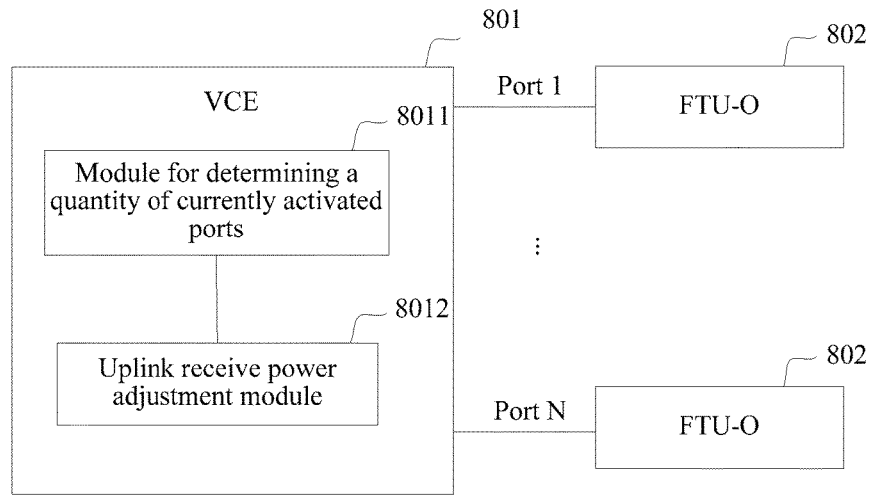

For a port i in N ports that are provided by a VCE and used to connect to FTU-Rs, when the port i is activated at a historical moment, determine, when each port j in the other N−1 ports and the port i are activated at the same time, a power value of downlink FEXT caused to a signal on a line corresponding to the port i by a signal on a line corresponding to the port j, and a downlink receive power value of an FTU-R connected to the port i, where i, j = 1, 2, ..., N, and i is not equal to j

S902

When the port i is activated, determine, according to the determined downlink FEXT power value and the determined downlink receive power value of the FTU-R corresponding to the port i, a downlink virtual power margin corresponding to the port i; and send the downlink virtual power margin to the FTU-R connected to the port i, so that the FTU-R connected to the port i performs downlink receive power adjustment according to the downlink virtual power margin

FIG. 9

POWER ADJUSTMENT DEVICE AND METHOD

CROSS-REFERENCE TO RELATED APPLICATIONS

This application is a continuation of International Patent Application No. PCT/CN2013/087960, filed on Nov. 27, 2013, which is hereby incorporated by reference in its entirety.

TECHNICAL FIELD

Embodiments of the present invention relate to the field of communications technologies, and in particular, to a power adjustment device and method.

BACKGROUND

A digital subscriber line (DSL) is a high-speed transmission technology in which data transmission is performed by using a telephone line, that is, an unshielded twisted pair (UTP).

In a DSL system, a system providing multiple DSL accesses is referred to as a DSL access multiplexer (DSLAM). Because of the electromagnetic induction principle, mutual interference is generated among multiple signals sent to a same DSLAM, and is referred to as crosstalk As shown in FIG. 1, a port 1 of a DSLAM1 is connected to a user terminal 1 (hereinafter referred to as "terminal 1"), a port 2 of the DSLAM1 is connected to a terminal 2, a port 3 of a DSLAM2 is connected to a terminal 3, and a port 4 of the DSLAM2 is connected to a terminal 4. On a DSLAM1 side, a signal sent to the terminal 1 through the port 1 is received by the port 2, and therefore, causes interference to a signal sent to the port 2 by the terminal 2; a signal sent to the terminal 2 through the port 2 is received by the port 1, and therefore, causes interference to a signal sent to the port 1 by the terminal 1 (a case on a terminal side is similar). This interference is referred to as near end crosstalk (Near End crossTalk, NEXT). A signal sent to the terminal 3 by the DSLAM2 through the port 3 is received by the terminal 4, and therefore, causes interference to a signal sent through the port 4 to the terminal 4; a signal sent to the terminal 4 by the DSLAM2 through the port 4 is received by the terminal 3, and therefore, causes interference to a signal sent through the port 3 to the terminal 3 (a case on the terminal side is similar). This interference is referred to as far end crosstalk (FEXT). Further, FEXT is classified into uplink FEXT and downlink FEXT. FEXT received by a terminal is downlink FEXT, and FEXT received by a DSLAM is uplink FEXT.

As the DSL technology evolves, a spectrum is extended to 250 MHz in a next-generation copper bandwidth access technology G.fast, which is far greater than that in a conventional DSL system. Therefore, in a G.fast system, FEXT is far higher than that in the conventional DSL system. For a G.fast system in which one bundle includes 15 cables, when each port is activated and no crosstalk is canceled, FEXT among the cables is nearly 40 dB higher than that when a single port is activated, and a crosstalk amount of the FEXT increases with an increase in frequency.

In order to decrease FEXT among cables in the G.fast system, a linear precoding technology such as a vectored-DSL technology may be used to perform joint transmission and joint reception at the DSLAM end. However, it is difficult to eliminate high-frequency FEXT in the G.fast system by using the linear precoding technology. Therefore, a nonlinear precoding technology based on, for example, QR decomposition (Tomlinson-Harashima-Precoding, QR-THP), appears.

In a G.fast system using nonlinear precoding such as QR-THP, a DSLAM includes a vectoring control entity (VCE) and a G.fast transceiver unit at the side of the operator end of the loop (G.fast transceiver Unit at the side of the operator end of the loop, FTU-O); and a device on a terminal side includes a G.fast transceiver unit at the side of the subscriber end of the loop (G.fast transceiver Unit at the side of the subscriber end of the loop, FTU-R).

In the G.fast system, the VCE is used to perform crosstalk precoding on a transmit signal sent to a terminal by a DSLAM (hereinafter referred to as "downlink"), and is further used to perform crosstalk cancellation on a received signal sent to a DSLAM by a terminal (hereinafter referred to as "uplink"). The FTU-O is used to transmit uplink and downlink data streams and uplink and downlink control messages between the VCE and the FTU-R. Each port corresponds to one FTU-O and one FTU-R, and the FTU-O is connected to the FTU-R by using a line.

In the downlink direction, after a downlink data stream undergoes nonlinear precoding and passes through a crosstalk channel, FEXT still exists when the downlink data stream enters an input end of the FTU-R, and in some scenarios, signal energy of the FEXT may be about 3 dB higher than signal energy obtained when a single port is activated. In the uplink direction, an uplink data stream passes through a crosstalk channel and undergoes crosstalk cancellation, FEXT also exists when the uplink data stream enters an input end of the FTU-O.

As shown in FIG. 2, in the G.fast system, regardless of the uplink direction or the downlink direction, a transmit end sends a signal to a receive end through a channel, and a programmable gain amplifier (PGA) of the receive end adjusts a receive power under control of a PGA training module.

First, in a DSL handshake or initialization process, the PGA training module obtains a target input power Pt of an analog to digital converter (ADC) according to a maximum input power allowed by the ADC and a peak-to-average ratio (PAR) of a received signal of the receive end, where a unit is dB:

$$Pt=\text{ADC maximum power}-PAR \qquad \text{formula 1}$$

Then, the PGA training module determines an actual input power P1 of the ADC, and further calculates a power adjustment amount delta=Pt−P1.

Finally, an adjusted PGA gain=current PGA gain+delta is obtained.

After a showtime is entered, that is, after a service is actually run, the PGA gain is unchanged, that is, receive power adjustment is no longer performed.

In the foregoing receive power adjustment process, during calculation of the target input power of the ADC, impact of FEXT is not considered. Therefore, when FEXT exists, the actual input power of the ADC may be excessively large. Consequently, signal clipping may occur in subsequent processing processes of filtering based on down-sampling and Fast Fourier Transform (FFT) of the receive end.

To sum up, in the existing G.fast system, when nonlinear precoding is used to perform FEXT cancellation, impact of FEXT on an ADC input signal of a receive end is not considered, and consequently, the receive end cannot work normally.

SUMMARY

Embodiments of the present invention provide a power adjustment device and method, so as to resolve a problem that because a receive end cannot perform receive power adjustment according to FEXT, the receive end cannot work normally.

According to a first aspect, a VCE is provided, where the VCE provides N ports that are separately used to connect to different FTU-Rs, and the VCE includes:

a downlink FEXT determining module, configured to: for a port i in the N ports, when the port i is activated at a historical moment, determine, when each port j in the other N−1 ports and the port i are activated at the same time, a power value U_dl(i,j) of downlink FEXT caused to a signal on a line corresponding to the port i by a signal on a line corresponding to the port j, and a downlink receive power value U_dl(i,i) of an FTU-R connected to the port i, where i, j=1, 2, . . . , N, and i is not equal to j; and a downlink receive power adjustment module, configured to: when the port i is activated, determine, according to the downlink FEXT power value U_dl(i,j) and the downlink receive power value U_dl(i,i) of the FTU-R corresponding to the port i that are determined by the downlink FEXT determining module, a downlink virtual power margin VirtualPwr_dl(i) corresponding to the port i; and send the downlink virtual power margin VirtualPwr_dl(i) to the FTU-R connected to the port i, so that the FTU-R connected to the port i performs downlink receive power adjustment according to the downlink virtual power margin VirtualPwr_dl(i).

With reference to the first aspect, in a first possible implementation manner, the downlink receive power adjustment module is specifically configured to determine, according to the following formula, the downlink virtual power margin VirtualPwr_dl(i) corresponding to the port i:

$$\text{VirtualPwr\_dl}(i) = 10 * \log_{10}\left(\frac{\sum_{j=1}^{N} U\_dl(i,j)}{\sum_{j=1, \text{ and } j \in \text{accurrently activated port}}^{N} U\_dl(i,j)}\right).$$

With reference to the first possible implementation manner of the first aspect, in a second possible implementation manner, the downlink FEXT determining module is specifically configured to:

determine the downlink FEXT power value U_dl(i,j) and the downlink receive power value U_dl(i,i) according to an error amount reported by the FTU-R connected to the port i, where the error amount is a difference that is between a sampling point vector and a standard point vector and determined by a constellation decider in the FTU-R connected to the port i.

With reference to the first possible implementation manner of the first aspect, in a third possible implementation manner, the downlink FEXT determining module is specifically configured to:

determine the downlink FEXT power value U_dl(i,j) according to a historical coefficient of downlink crosstalk of the port j to the port i, and determine the downlink receive power value U_dl(i,i) according to a historical coefficient of downlink crosstalk of the port i to the port i itself.

With reference to the first aspect, the first possible implementation manner of the first aspect, the second possible implementation manner of the first aspect, and the third possible implementation manner of the first aspect, in a fourth possible implementation manner, the downlink receive power adjustment module is specifically configured to:

add, by using an FTU-O connected to the port i, the downlink virtual power margin VirtualPwr_dl(i) to a special operation channel SOC message and send the SOC message to the FTU-R connected to the port i.

According to a second aspect, a VCE is provided, where the VCE provides N ports that are separately used to connect to different FTU-Rs; and the VCE includes:

a module for determining a quantity of currently activated ports, configured to determine a quantity of currently activated ports; and a downlink receive power adjustment module, configured to: determine a downlink virtual power margin according to the quantity of currently activated ports that is determined by the module for determining a quantity of currently activated ports; and send the determined downlink virtual power margin to an FTU-R connected to a currently activated port, so that the FTU-R performs downlink receive power adjustment according to the downlink virtual power margin.

With reference to the second aspect, in a first possible implementation manner, the downlink receive power adjustment module is specifically configured to:

send the downlink virtual power margin to an FTU-O corresponding to the FTU-R, so that the FTU-O adds the downlink virtual power margin to a special operation channel SOC message and sends the SOC message to the FTU-R.

According to a third aspect, a power adjustment device is provided, including a vectoring control entity VCE and N FTU-Os, where the VCE provides N ports that are separately used to connect to different FTU-Os, each of the ports corresponds to one of the FTU-Os, and N is an integer greater than 1; and the VCE includes:

an uplink FEXT determining module, configured to: for a port i in the N ports, when the port i is activated at a historical moment, determine, when each port j in the other N−1 ports and the port i are activated at the same time, a power value U_ul(i,j) of uplink FEXT caused to a signal on a line corresponding to the port i by a signal on a line corresponding to the port j, and an uplink receive power value U_ul(i,i) of an FTU-O connected to the port i, where i, j=1, 2, . . . , N, and i is not equal to j; and an uplink receive power adjustment module, configured to: when the port i is activated, determine, according to the uplink FEXT power value U_ul(i,j) and the uplink receive power value U_ul(i,i) of the FTU-O corresponding to the port i that are determined by the uplink FEXT determining module, an uplink virtual power margin VirtualPwr_ul(i) corresponding to the port i; and send the uplink virtual power margin VirtualPwr_ul(i) to the FTU-O connected to the port i, so that the FTU-O connected to the port i performs uplink receive power adjustment according to the uplink virtual power margin VirtualPwr_ul(i).

With reference to the third aspect, in a first possible implementation manner, the uplink receive power adjustment module is specifically configured to determine, according to the following formula, the uplink virtual power margin VirtualPwr_ul(i) corresponding to the port i:

$$\text{VirtualPwr\_ul}(i) = 10 * \log_{10}\left(\frac{\sum_{j=1}^{N} U\_ul(i,j)}{\sum_{j=1, \text{and } j \in \text{accurrently activated port}}^{N} U\_ul(i,j)}\right).$$

With reference to the first possible implementation manner of the third aspect, in a second possible implementation manner, the uplink FEXT determining module is specifically configured to:

determine the uplink FEXT power value U and the uplink receive power value U_ul(i,i) according to an error amount reported by the FTU-O connected to the port i, where the error amount is a difference that is between a sampling point vector and a standard point vector and determined by a constellation decider in the FTU-O connected to the port i.

With reference to the first possible implementation manner of the third aspect, in a third possible implementation manner, the uplink FEXT determining module is specifically configured to:

determine the uplink FEXT power value U_ul(i, j) according to a historical coefficient of uplink crosstalk of the port j to the port i, and determine the uplink receive power value U_ul(i,i) according to a historical coefficient of uplink crosstalk of the port i to the port i itself.

According to a fourth aspect, a power adjustment device is provided, including a VCE and N FTU-Os, where the VCE provides N ports that are separately used to connect to different FTU-Os, each of the ports corresponds to one of the FTU-Os, and N is an integer greater than 1;

the VCE includes:

a module for determining a quantity of currently activated ports, configured to determine a quantity of currently activated ports; and a downlink receive power adjustment module, configured to: determine an uplink virtual power margin according to the quantity of currently activated ports that is determined by the module for determining a quantity of currently activated ports; and send the determined uplink virtual power margin to an FTU-O connected to a currently activated port; and the FTU-O is configured to receive the uplink virtual power margin sent by the VCE, and perform uplink receive power adjustment according to the uplink virtual power margin.

According to a fifth aspect, a downlink receive power adjustment method is provided, including:

for a port i in N ports that are provided by a VCE and used to connect to FTU-Rs, when the port i is activated at a historical moment, determining, when each port j in the other N−1 ports and the port i are activated at the same time, a power value U_dl(i,j) of downlink FEXT caused to a signal on a line corresponding to the port i by a signal on a line corresponding to the port j, and a downlink receive power value U_dl(i,i) of an FTU-R connected to the port i, where i, j=1, 2, . . . , N, and i is not equal to j; and when the port i is activated, determining, according to the determined downlink FEXT power value U_dl(i,j) and the determined downlink receive power value U_dl(i,i) of the FTU-R corresponding to the port i, a downlink virtual power margin VirtualPwr_dl(i) corresponding to the port i; and sending the downlink virtual power margin VirtualPwr_dl(i) to the FTU-R connected to the port i, so that the FTU-R connected to the port i performs downlink receive power adjustment according to the downlink virtual power margin VirtualPwr_dl(i).

With reference to the fifth aspect, in a first possible implementation manner, the downlink virtual power margin VirtualPwr_dl(i) corresponding to the port i is determined according to the following formula:

$$\text{VirtualPwr\_dl}(i) = 10 * \log_{10}\left(\frac{\sum_{j=1}^{N} U\_dl(i,j)}{\sum_{j=1, \text{and } j \in \text{accurrently activated port}}^{N} U\_dl(i,j)}\right).$$

With reference to the first possible implementation manner of the fifth aspect, in a second possible implementation manner, the downlink FEXT power value U_dl(i,j) and the downlink receive power value U_dl(i,i) are determined according to an error amount reported by the FTU-R connected to the port i, where the error amount is a difference that is between a sampling point vector and a standard point vector and determined by a constellation decider in the FTU-R connected to the port i.

With reference to the first possible implementation manner of the fifth aspect, in a third possible implementation manner, the downlink FEXT power value U_dl(i,j) is determined according to a historical coefficient of downlink crosstalk of the port j to the port i, and the downlink receive power value U_dl(i,i) is determined according to a historical coefficient of downlink crosstalk of the port i to the port i itself.

With reference to the fifth aspect, the first possible implementation manner of the fifth aspect, the second possible implementation manner of the fifth aspect, and the third possible implementation manner of the fifth aspect, in a fourth possible implementation manner, the sending the downlink virtual power margin VirtualPwr_dl(i) to the FTU-R connected to the port i includes:

adding, by using an FTU-O connected to the port i, the downlink virtual power margin VirtualPwr_dl(i) to a special operation channel SOC message and sending the SOC message to the FTU-R connected to the port i.

According to a sixth aspect, a downlink receive power adjustment method is provided, including:

determining a quantity of currently activated ports in N ports that are provided by a VCE and used to connect to different FTU-Rs, where N is an integer greater than 1; and determining a downlink virtual power margin according to the determined quantity of currently activated ports; and sending the determined downlink virtual power margin to an FTU-R connected to a currently activated port, so that the FTU-R performs downlink receive power adjustment according to the downlink virtual power margin.

With reference to the sixth aspect, in a first possible implementation manner, the sending the downlink virtual power margin to the FTU-R includes:

sending the downlink virtual power margin to an FTU-O corresponding to the FTU-R, so that the FTU-O adds the downlink virtual power margin to a special operation channel SOC message and sends the SOC message to the FTU-R.

According to a seventh aspect, an uplink receive power adjustment method is provided, including:

for a port i of N ports that are provided by a VCE and used to connect to FTU-Os, when the port i is activated at a historical moment, determining, when each port j in the other N−1 ports and the port i are activated at the same time, a power value U_ul(i,j) of uplink FEXT caused to a signal on a line corresponding to the port i by a signal on a line corresponding to the port j, and an uplink receive power value U_ul(i,i) of an FTU-O connected to the port i, where i, j=1, 2, ..., N, and i is not equal to j; and when the port i is activated, determining, according to the determined uplink FEXT power value U_ul(i,j) and the determined uplink receive power value U_ul(i,i) of the FTU-O corresponding to the port i, an uplink virtual power margin VirtualPwr_ul(i) corresponding to the port i; and sending the uplink virtual power margin VirtualPwr_ul(i) to the FTU-O connected to the port i, so that the FTU-O connected to the port i performs uplink receive power adjustment according to the uplink virtual power margin VirtualPwr_ul(i).

With reference to the seventh aspect, in a first possible implementation manner, the uplink virtual power margin VirtualPwr_ul(i) corresponding to the port i is determined according to the following formula:

$$\text{VirtualPwr\_ul}(i) = 10 * \log_{10}\left(\frac{\sum_{j=1}^{N} U\_ul(i,j)}{\sum_{j=1, \text{and } j \equiv \text{acurrently activated port}}^{N} U\_ul(i,j)}\right).$$

With reference to the first possible implementation manner of the seventh aspect, in a second possible implementation manner, the uplink FEXT power value U_ul(i,j) and the uplink receive power value U_ul(i,i) are determined according to an error amount reported by the FTU-O connected to the port i, where the error amount is a difference that is between a sampling point vector and a standard point vector and determined by a constellation decider in the FTU-O connected to the port i.

With reference to the first possible implementation manner of the seventh aspect, in a third possible implementation manner, the uplink FEXT power value U_ul(i,j) is determined according to a historical coefficient of uplink crosstalk of the port j to the port i, and the uplink receive power value U_ul(i,i) is determined according to a historical coefficient of uplink crosstalk of the port i to the port i itself.

According to an eighth aspect, an uplink receive power adjustment method is provided, where the method includes:

determining a quantity of currently activated ports in N ports that are provided by a VCE and used to connect to different FTU-Os, where N is an integer greater than 1; and determining an uplink virtual power margin according to the determined quantity of currently activated ports; and sending the determined uplink virtual power margin to an FTU-O connected to a currently activated port, so that the FTU-O performs uplink receive power adjustment according to the uplink virtual power margin.

BRIEF DESCRIPTION OF DRAWINGS

FIG. 8 is a schematic diagram of a structure of a second uplink receive power adjustment device according to an embodiment of the present invention;

FIG. 9 is a schematic diagram of a process of a first downlink receive power adjustment method according to an embodiment of the present invention;

DESCRIPTION OF EMBODIMENTS

In embodiments of the present invention, on the one hand, a receive end performs receive power adjustment according to FEXT received by the receive end and a receive power of the receive end, thereby avoiding a problem that because a receive end in an existing system cannot perform receive power adjustment according to FEXT, the receive end cannot work normally.

On the other hand, a virtual power margin generated when a receive end performs receive power adjustment is determined according to a quantity of currently activated ports, and the margin value is sent to the receive end, so that the receive end performs receive power adjustment according to the margin value, which can resolve a problem that in an existing system, a receive end cannot work normally because an excessively large receive power causes signal clipping.

Although a G.fast system is used as an example in the embodiments of the present invention, it does not mean that a method and a device of the present invention are only applicable to the G.fast system. Actually, in all other DSL systems having the technical problem in the background, the solution and the device provided by the present invention may be used to adjust a receive power.

The following further describes the embodiments of the present invention in detail with reference to accompanying drawings in this specification.

Figure 1:
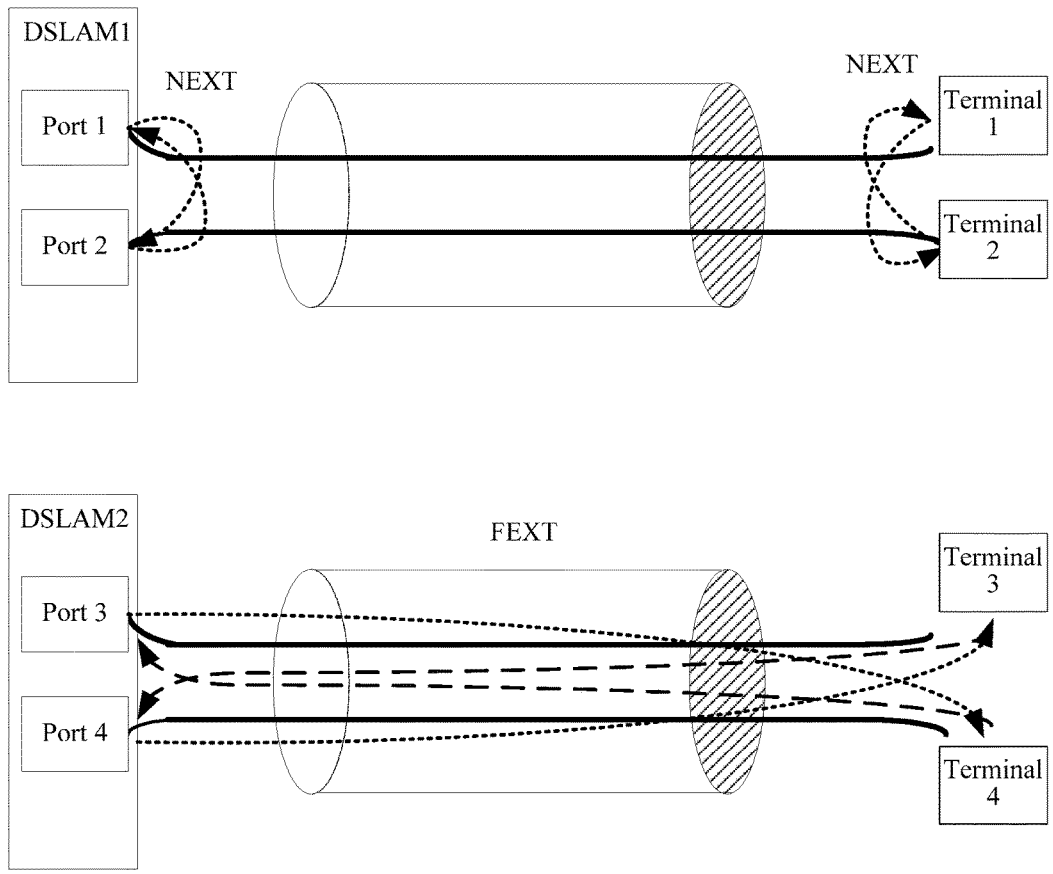
FIG. 1 is a schematic diagram of crosstalk in a DSL system.
Figure 2:
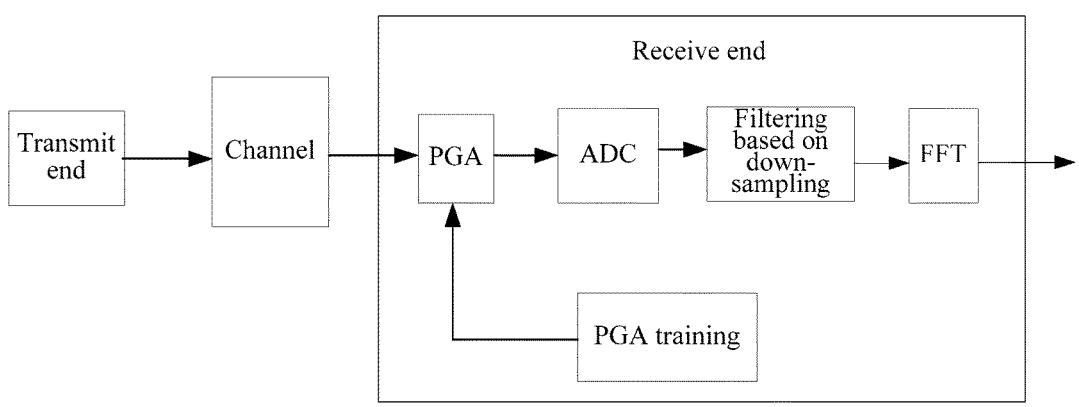
FIG. 2 is a schematic diagram of a power adjustment process of a receive end in a general DSL system.
Figure 3:
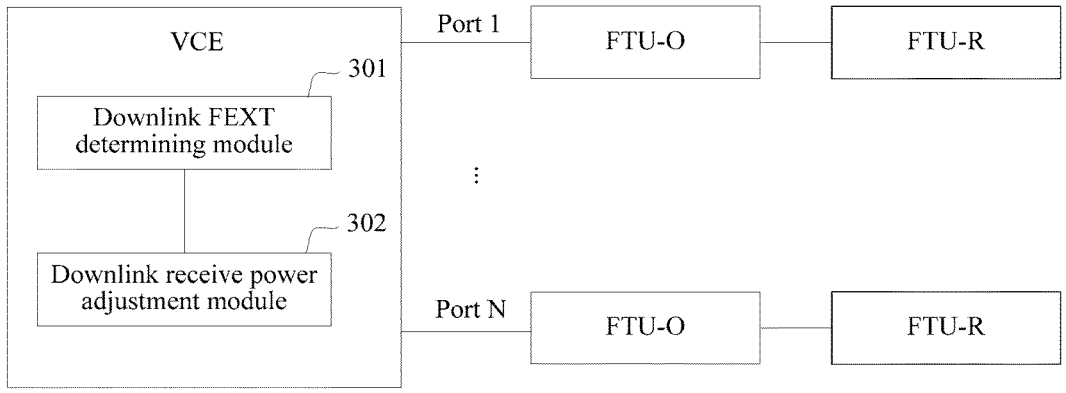
FIG. 3 is a schematic diagram of a structure of a first VCE according to an embodiment of the present invention.

FIG. 3 is a schematic diagram of a structure of a first VCE according to an embodiment of the present invention. As shown in FIG. 3, the VCE provides N ports that are separately used to connect to different transceiver units at the side of the subscriber end of the loop FTU-Rs; and the VCE includes:

a downlink far end crosstalk FEXT determining module 301, configured to: for a port i in the N ports, when the port i is activated at a historical moment, determine, when each port j in the other N−1 ports and the port i are activated at the same time, a power value U_dl(i,j) of downlink FEXT caused to a line corresponding to the port i by a signal on a line corresponding to the port j, and a downlink receive power value U_dl(i,i) of an FTU-R connected to the port i, where i, j=1, 2, . . . , N, and i is not equal to j; and a downlink receive power adjustment module 302, configured to: when the port i is activated, determine, according to the downlink FEXT power value U_dl(i,j) and the downlink receive power value U_dl(i,i) of the FTU-R corresponding to the port i that are determined by the downlink FEXT determining module 301, a downlink virtual power margin VirtualPwr_dl(i) corresponding to the port i; and send the downlink virtual power margin VirtualPwr_dl(i) to the FTU-R connected to the port i, so that the FTU-R connected to the port i performs downlink receive power adjustment according to the downlink virtual power margin VirtualPwr_dl(i).

The FTU-R may perform downlink receive power adjustment according to the following formula:

$$Pt\_dl = ADC \text{ maximum input power}\_dl - PAR\_dl - VirtualPwr\_dl \quad \text{formula 2}$$

where Pt_dl is an ADC target input power in the FTU-R after the downlink receive power adjustment is performed, ADC maximum input power_dl is a maximum input power allowed by an ADC in the FTU-R, PAR_dl is a peak-to-average ratio of a received signal of the FTU-R, and VirtualPwr_dl is a downlink virtual power margin received by the FTU-R.

Because FEXT is considered during determining of the ADC target input power, and the downlink virtual power margin determined according to the FEXT is deducted, the ADC input power may not be excessively large, which further avoids signal clipping that may occur when the method in the background is used.

Optionally, the VCE may also be connected to the FTU-R by using the FTU-O connected to each port, where the FTU-O, the port, and the FTU-R are in a one-to-one correspondence; or the VCE may be directly connected to the FTU-R.

When the VCE is connected to the FTU-R by using the FTU-O connected to each port, optionally, the downlink receive power adjustment module 302 is specifically configured to:

add, by using a transceiver unit at the side of the operator end of the loop FTU-O connected to the port i, the downlink virtual power margin VirtualPwr_dl(i) to a special operation channel SOC message and send the SOC message to the FTU-R connected to the port i.

The SOC message is a message specified in the VDSL/G.fast protocol, and used in all message exchanges in an initialization phase. For the definition of the existing SOC message, reference may be made to the ITU-T 993.2 disclosed in the protocol in February, 2006. For example, a field VIRTUALPWR_DL may be added to O-SIGNATURE in an FTU-O message, where a data format of the field may be: 10 bit signed number complements, where a unit is 0.1 dB. The manner of the definition is not limited thereto, and it may also be that the field is added to another FTU-O message, for example, O-UPDATE, so as to send the downlink virtual power margin to the FTU-R.

Specifically, for a method used by the downlink FEXT determining module 301 to determine the power value U_(i,j) of the downlink FEXT caused to the signal on the line corresponding to the port i by the signal on the line corresponding to the port j, and the downlink receive power value U_dl(i,i) of the FTU-R connected to the port i, and a method used by the downlink receive power adjustment module 302 to determine the downlink virtual power margin VirtualPwr_dl(i) corresponding to the port i, reference may be made to the following example 1 and example 2.

Figure 4:
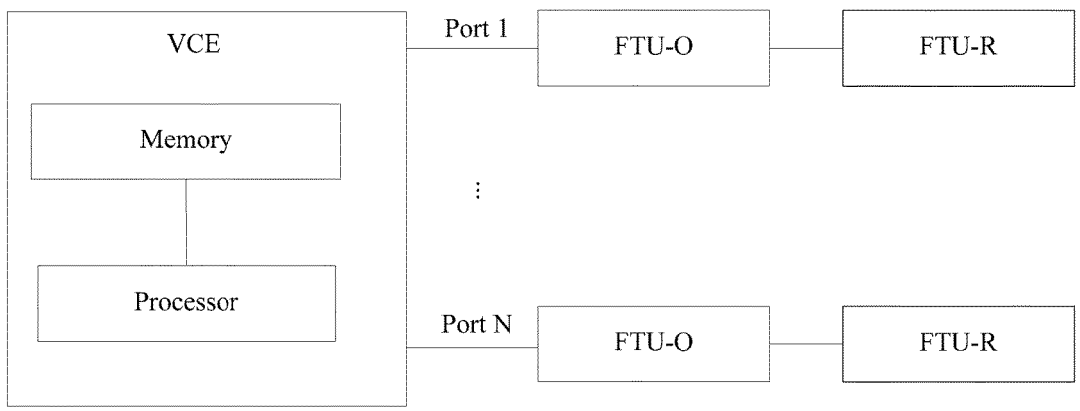
FIG. 4 is another schematic diagram of a structure of the first VCE according to an embodiment of the present invention.

When the first VCE provided by this embodiment of the present invention is implemented, optionally, the manner shown in FIG. 4 may be used. In FIG. 4, a memory is configured to store a downlink receive power adjustment program; and a processor executes the operations of the downlink far end crosstalk FEXT determining module 301 and the downlink receive power adjustment module 302 in FIG. 3 by invoking the downlink receive power adjustment program stored in the memory.

Figure 5:
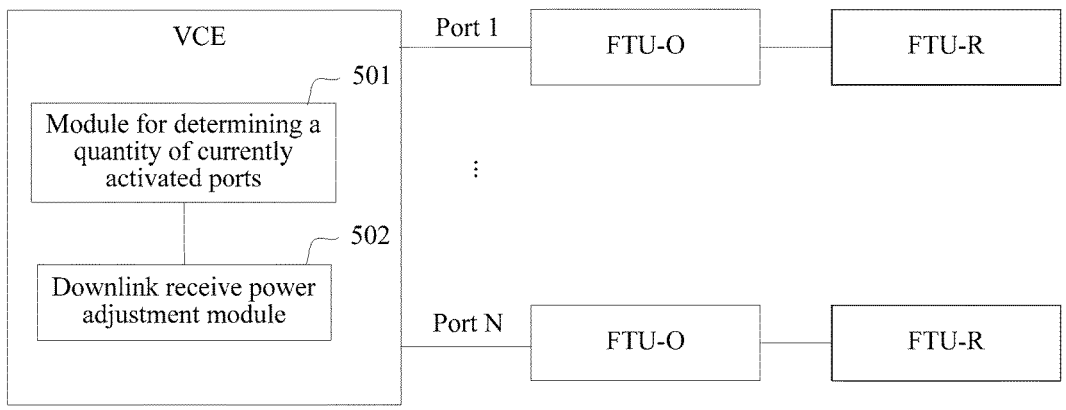
FIG. 5 is a schematic diagram of a structure of a second VCE according to an embodiment of the present invention.

FIG. 5 shows a second VCE according to an embodiment of the present invention. As shown in FIG. 5, the VCE provides N ports that are separately used to connect to different transceiver units at the side of the subscriber end of the loop FTU-Rs; and the VCE includes:

a module 501 for determining a quantity of currently activated ports, configured to determine a quantity of currently activated ports; and a downlink receive power adjustment module 502, configured to: determine a downlink virtual power margin according to the quantity of currently activated ports that is determined by the module 501 for determining a quantity of currently activated ports; and send the determined downlink virtual power margin to an FTU-R connected to a currently activated port, so that the FTU-R performs downlink receive power adjustment according to the downlink virtual power margin.

The FTU-R may also perform downlink receive power adjustment according to formula 2.

Because when determining an ADC target input power, the FTU-R performs downlink receive power adjustment according to the determined downlink virtual power margin, and the downlink virtual power is determined according to the quantity of currently activated ports, so that the ADC input power may not be excessively large, which further avoids signal clipping that may occur when the method in the background is used. Moreover, because a method for determining a downlink virtual power is simplified, processing load of the VCE is reduced.

Optionally, the VCE may also be connected to the FTU-R by using the FTU-O connected to each port, where the FTU-O, the port, and the FTU-R are in a one-to-one correspondence; or the VCE may be directly connected to the FTU-R.

When the VCE is connected to the FTU-R by using the FTU-O connected to each port, optionally, the downlink receive power adjustment module 502 is specifically configured to:

add, by using a transceiver unit at the side of the operator end of the loop FTU-O connected to the port i, the downlink virtual power margin VirtualPwr_dl(i) to a special operation channel SOC message and send the SOC message to the FTU-R connected to the port i.

For the solution in which a downlink virtual power margin is sent in an FTU-O message, reference may be made to the solution in the first power adjustment device provided by the embodiments of the present invention, and no further details are described again herein.

Optionally, the downlink receive power adjustment module 502 determines the downlink virtual power margin according to the following formula:

$$\text{VirtualPwr\_dl} = 10 * \log_{10} \frac{N}{ActPortNum} \qquad \text{formula 3}$$

where VirtualPwr_dl is a downlink virtual power margin, N is a total quantity of ports, and ActPortNum is a quantity of currently activated ports that is determined by the module 501 for determining a quantity of currently activated ports.

When the second VCE provided by this embodiment of the present invention is implemented, optionally, the manner shown in FIG. 4 may also be used, where a memory is configured to store a downlink receive power adjustment program. However, a difference from the first VCE provided by the embodiments of the present invention, in the second VCE, a processor executes the operations of the module 501 for determining a quantity of currently activated ports and the downlink receive power adjustment module 502 in FIG. 5 by invoking the downlink receive power adjustment program stored in the memory.

Figure 6:
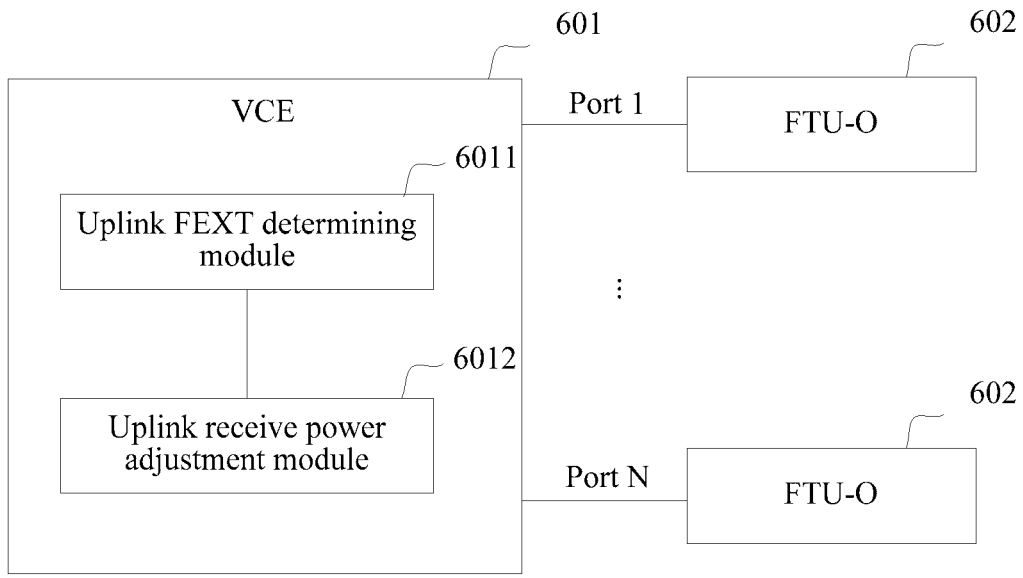
FIG. 6 is a schematic diagram of a structure of a first uplink receive power adjustment device according to an embodiment of the present invention.

FIG. 6 is a schematic diagram of a structure of a first uplink receive power adjustment device according to an embodiment of the present invention. As shown in FIG. 6, the device includes: a VCE 601 and N FTU-Os 602, where the VCE 601 provides N ports that are separately used to connect to different FTU-Os 602, each of the ports corresponds to one of the FTU-Os 602, and N is an integer greater than 1; and the VCE 601 includes:

an uplink FEXT determining module 6011, configured to: for a port i in the N ports, when the port i is activated at a historical moment, determine, when each port j in the other N−1 ports and the port i are activated at the same time, a power value U_ul(i,j) of uplink FEXT caused to a signal on a line corresponding to the port i by a signal on a line corresponding to the port j, and an uplink receive power value U_ul(i,i) of an FTU-O connected to the port i, where i, j=1, 2, ..., N, and i is not equal to j; and an uplink receive power adjustment module 6012, configured to: when the port i is activated, determine, according to the uplink FEXT power value U_ul(i,j) and the uplink receive power value U_ul(i,i) of the FTU-O corresponding to the port i that are determined by the uplink FEXT determining module 6011, an uplink virtual power margin VirtualPwr_ul(i) corresponding to the port i; and send the uplink virtual power margin VirtualPwr_ul(i) to the FTU-O connected to the port i, so that the FTU-O connected to the port i performs uplink receive power adjustment according to the uplink virtual power margin VirtualPwr_ul (i).

The FTU-O 602 may perform downlink receive power adjustment according to the following formula:

Pt_ul=ADC maximum input power_ul−PAR_ul−VirtualPwr_ul  formula 4 where Pt_ul is an ADC target input power in the FTU-O 602 after the uplink receive power adjustment is performed, ADC maximum input power_ul is a maximum input power allowed by an ADC in the FTU-O 602, PAR_ul is a peak-to-average ratio of a received signal of the FTU-O 602, and VirtualPwr_ul is an uplink virtual power margin received by the FTU-O 602.

Because FEXT is considered during determining of the ADC target input power, and the uplink virtual power margin determined according to the FEXT and the uplink receive power is deducted, the ADC input power may not be excessively large, which further avoids signal clipping that may occur when the method in the background is used.

Specifically, for a method used by the uplink FEXT determining module 6011 to determine the power value U_ul(i,j) of uplink FEXT caused to the signal on the line corresponding to the port i by the signal on the line corresponding to the port j, and the uplink receive power value U_ul(i,i) of the FTU-R connected to the port i, and a method used by the uplink receive power adjustment module 6012 to determine the uplink virtual power margin VirtualPwr_ul (i) corresponding to the port i, reference may be made to the following example 3 and example 4.

Figure 7:
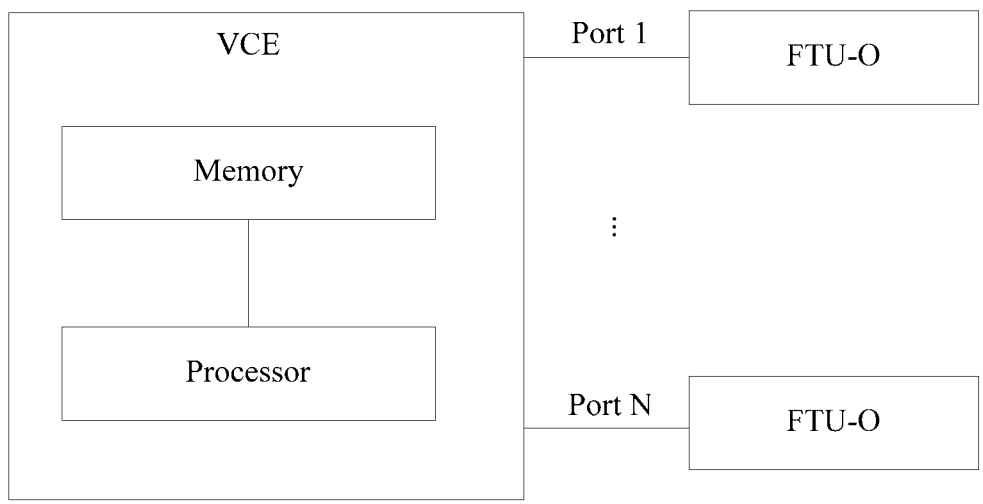
FIG. 7 is another schematic diagram of a structure of the first uplink receive power adjustment device according to an embodiment of the present invention.

When the first uplink receive power adjustment device provided by this embodiment of the present invention is implemented, optionally, the manner shown in FIG. 7 may be used, where a memory is configured to store an uplink receive power adjustment program, and a processor executes the operations of the uplink FEXT determining module 6011 and the uplink receive power adjustment module 6012 in FIG. 6 by invoking the uplink receive power adjustment program stored in the memory.

FIG. 8 is a schematic diagram of a structure of a second uplink receive power adjustment device according to an embodiment of the present invention. As shown in FIG. 8, the device includes: a vectoring control entity VCE 801 and N transceiver units at the side of the operator end of the loop FTU-Os 802, where the VCE 801 provides N ports that are separately used to connect to different FTU-Os 802, each of the ports corresponds to one of the FTU-Os 802, and N is an integer greater than 1; the VCE 801 includes:

a module 8011 for determining a quantity of currently activated ports, configured to determine a quantity of currently activated ports; and a downlink receive power adjustment module 8012, configured to: determine an uplink virtual power margin according to the quantity of currently activated ports that is determined by the module 8011 for determining a quantity of currently activated ports; and send the determined uplink virtual power margin to a transceiver unit at the side of the operator end of the loop FTU-O connected to a currently activated port; and the FTU-O 802 is configured to receive the uplink virtual power margin sent by the VCE 801, and perform uplink receive power adjustment according to the uplink virtual power margin.

Specifically, the FTU-O 802 may perform uplink receive power adjustment according to formula 4.

Specifically, the downlink receive power adjustment module 8012 may determine an uplink virtual power margin VirtualPwr_ul according to the following formula, where a unit is dB:

$$\text{VirtualPwr\_ul} = 10 * \log_{10} \frac{N}{ActPortNum} \qquad \text{formula 5}$$

where ActPortNum is the quantity of currently activated ports that is determined by the module 8011 for determining a quantity of currently activated ports.

When the second uplink receive power adjustment device provided by this embodiment of the present invention is implemented, optionally, the manner shown in FIG. 7 may also be used, where a memory is configured to store an uplink receive power adjustment program. However, a difference from the first uplink receive power adjustment device provided by the embodiments of the present invention is that, in the second uplink receive power adjustment device, a processor executes the operations of the module 8011 for determining a quantity of currently activated ports and the uplink receive power adjustment module 8012 in FIG. 8 by invoking the uplink receive power adjustment program stored in the memory.

Based on the same invention idea, the embodiments of the present invention further provide a receive power adjustment method. Because a principle in the method for resolving the problem is similar to that in the device in the embodiments of the present invention, for implementation of the method, reference may be made to the implementation of the device, and repeated parts are not described again.

FIG. 9 is a schematic diagram of a process of a first downlink receive power adjustment method according to an embodiment of the present invention. As shown in FIG. 9, the method includes:

S901: For a port i in N ports that are provided by a VCE and used to connect to FTU-Rs, when the port i is activated at a historical moment, determine, when each port j in the other N−1 ports and the port i are activated at the same time, a power value U_dl(i,j) of downlink FEXT caused to a signal on a line corresponding to the port i by a signal on a line corresponding to the port j, and a downlink receive power value U_dl(i,i) of an FTU-R connected to the port i, where i, j=1, 2, . . . , N, and i is not equal to j.

S902: When the port i is activated, determine, according to the determined downlink FEXT power value U_dl(i,j) and the determined downlink receive power value U_dl(i,i) of the FTU-R corresponding to the port i, a downlink virtual power margin VirtualPwr_dl(i) corresponding to the port i; and send the downlink virtual power margin VirtualPwr_dl(i) to the FTU-R connected to the port i, so that the FTU-R connected to the port i performs downlink receive power adjustment according to the downlink virtual power margin VirtualPwr_dl(i).

Optionally, the FTU-R performs downlink receive power adjustment according to formula 2.

For a method for determining the power value U_ul(i,j) of downlink FEXT caused to the signal on the line corresponding to the port i by the signal on the line corresponding to the port j, and the downlink receive power value U_dl(i,i) of the FTU-R connected to the port i, and a method for determining the downlink virtual power margin VirtualPwr_dl(i) corresponding to the port i, reference may be made to the following example 1 and example 2.

Optionally, the sending the downlink virtual power margin VirtualPwr_dl(i) to the FTU-R connected to the port i includes:

adding, by using a transceiver unit at the side of the operator end of the loop FTU-O connected to the port i, the downlink virtual power margin VirtualPwr_dl(i) to a special operation channel SOC message and sending the SOC message to the FTU-R connected to the port i.

Figure 10:
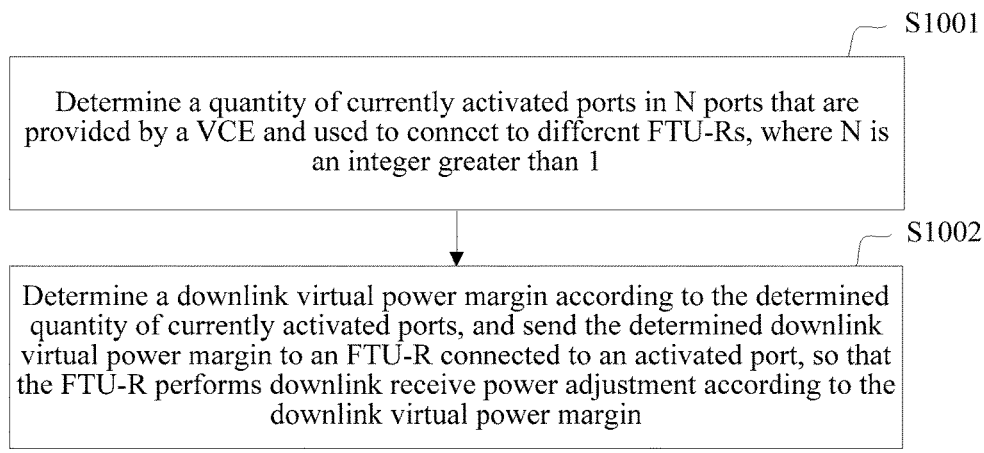
FIG. 10 is a schematic diagram of a process of a second downlink receive power adjustment method according to an embodiment of the present invention.

FIG. 10 is a schematic diagram of a process of a second downlink receive power adjustment method according to an embodiment of the present invention. As shown in FIG. 10, the method includes:

S1001: Determine a quantity of currently activated ports in N ports that are provided by a VCE and used to connect to different FTU-Rs, where N is an integer greater than 1.

S1002: Determine a downlink virtual power margin according to the determined quantity of currently activated ports, and send the determined downlink virtual power margin to an FTU-R connected to an activated port, so that the FTU-R performs downlink receive power adjustment according to the downlink virtual power margin.

Optionally, the downlink virtual power margin is determined according to formula 3.

The FTU-R performs downlink receive power adjustment according to formula 2.

Optionally, the sending the downlink virtual power margin to the FTU-R includes:

sending the downlink virtual power margin to an FTU-O corresponding to the FTU-R, so that the FTU-O adds the downlink virtual power margin to a special operation channel SOC message and sends the SOC message to the FTU-R.

Figure 11:
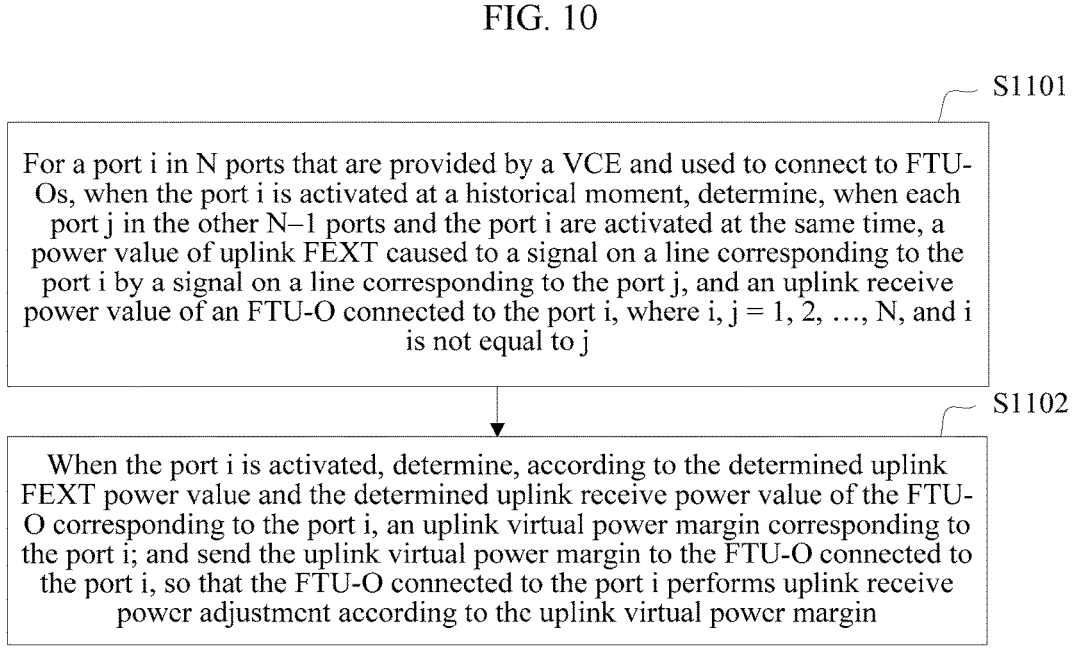
FIG. 11 is a schematic diagram of a process of a first uplink receive power adjustment method according to an embodiment of the present invention.

FIG. 11 is a schematic diagram of a process of a first uplink receive power adjustment method according to an embodiment of the present invention. As shown in FIG. 11, the method includes:

S1101: For a port i in N ports that are provided by a VCE and used to connect to FTU-Os, when the port i is activated at a historical moment, determine, when each port j in the other N−1 ports and the port i are activated at the same time, a power value U_ul(i,j) of uplink FEXT caused to a signal on a line corresponding to the port i by a signal on a line corresponding to the port j, and an uplink receive power value U_ul(i,i) of an FTU-O connected to the port i, where i, j=1, 2, . . . , N, and i is not equal to j.

S1102: When the port i is activated, determine, according to the determined uplink FEXT power value U_ul(i,j) and the determined uplink receive power value U_ul(i,i) of the FTU-O corresponding to the port i, an uplink virtual power margin VirtualPwr_ul(i) corresponding to the port i; and send the uplink virtual power margin VirtualPwr_ul(i) to the FTU-O connected to the port i, so that the FTU-O connected to the port i performs uplink receive power adjustment according to the uplink virtual power margin VirtualPwr_ul(i).

Optionally, the FTU-O performs uplink receive power adjustment according to formula 4.

Specifically, for a method for determining the power value U_ul(i,j) of uplink FEXT caused to the signal on the line corresponding to the port i by the signal on the line corresponding to the port j, and the uplink receive power value U_ul(i,i) of the FTU-O connected to the port i, and a method for determining the uplink virtual power margin VirtualPwr_ul(i) corresponding to the port i, reference may be made to the following example 3 and example 4.

Figure 12:
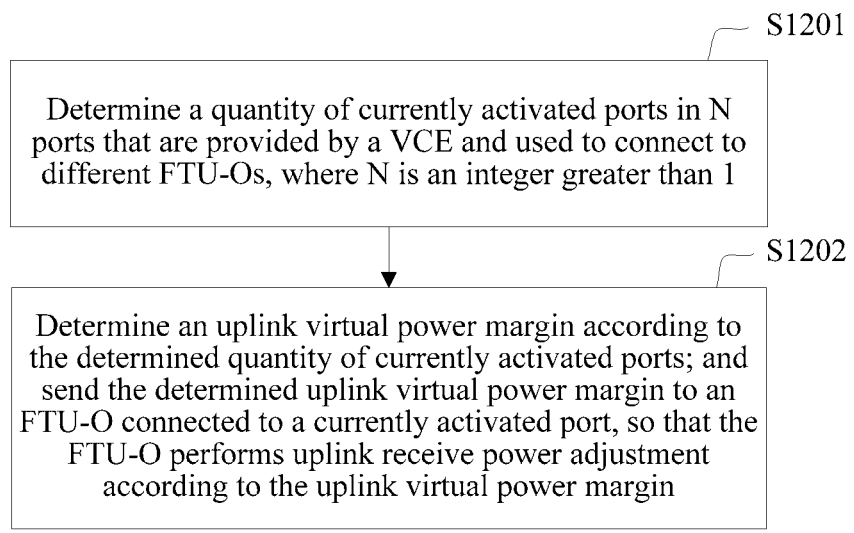
FIG. 12 is a schematic diagram of a process of a second uplink receive power adjustment method according to an embodiment of the present invention.

FIG. 12 is a schematic diagram of a process of a second uplink receive power adjustment method according to an embodiment of the present invention. As shown in FIG. 12, the method includes:

S1201: Determine a quantity of currently activated ports in N ports that are provided by a VCE and used to connect to different FTU-Os, where N is an integer greater than 1.

S1202: Determine an uplink virtual power margin according to the determined quantity of currently activated ports; and send the determined uplink virtual power margin to an FTU-O connected to a currently activated port, so that the FTU-O performs uplink receive power adjustment according to the uplink virtual power margin.

The uplink virtual power margin may be determined according to formula 5.

The uplink receive power adjustment and downlink receive power adjustment solutions of the present invention are described below by using specific embodiments.

Embodiment 1

In Embodiment 1, a VCE determines a downlink virtual power margin, and sends the downlink virtual power margin to an FTU-R, for the FTU-R to perform downlink receive power adjustment. Herein, the VCE provides N ports that are used to connect to the FTU-Rs, where N=8.

Figure 13:
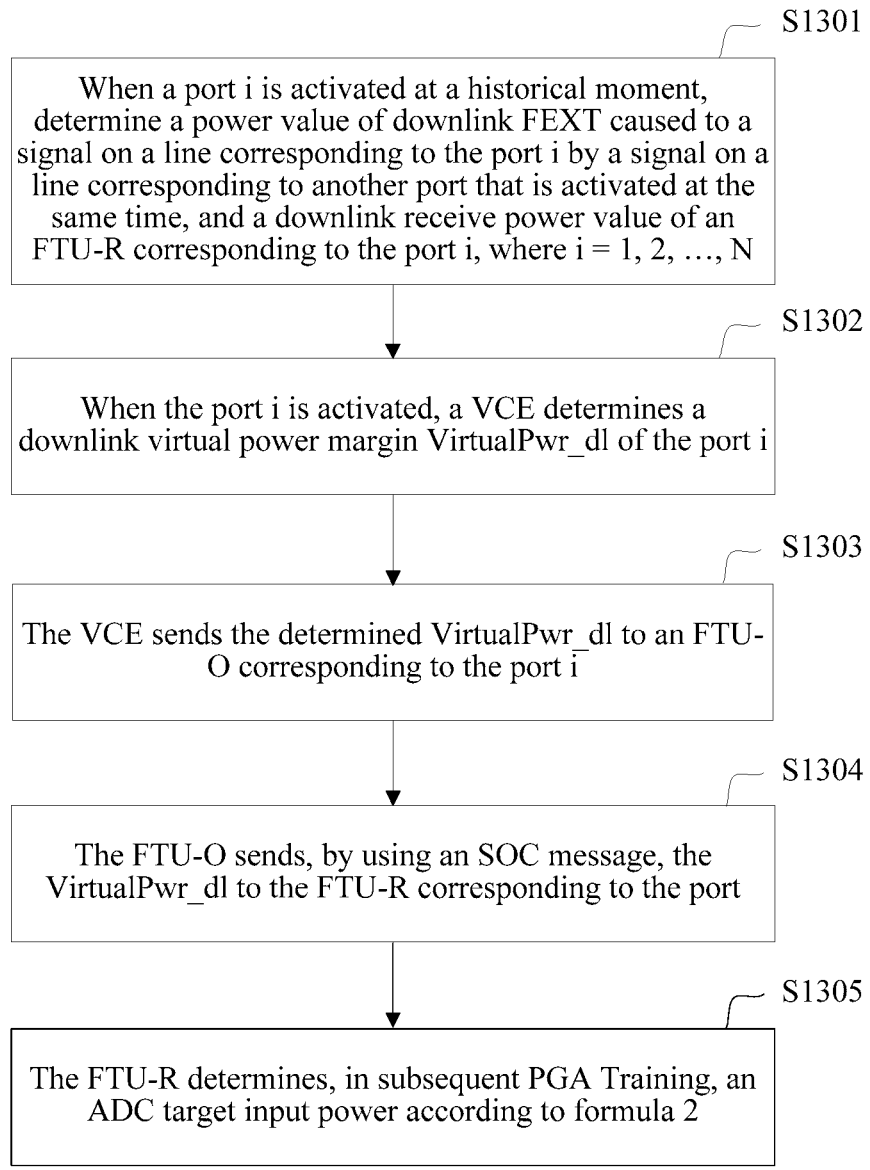
FIG. 13 is a schematic diagram of a process of a method in Embodiment 1.

As shown in FIG. 13, the method of Embodiment 1 includes the following steps:

S1301: When a port i is activated at a historical moment, determine a power value of downlink FEXT caused to a signal on a line corresponding to the port i by a signal on a line corresponding to another port that is activated at the same time, and a downlink receive power value of an FTU-R corresponding to the port i, where i=1, 2, ..., N.

Herein, using a port 1 as an example, when the port i is activated at a first historical moment T1, three other ports 2, 3 and 4 are activated at the same time, and ports 5, 6, 7 and 8 are not activated. Then, power values of downlink FEXT caused to a signal on a line corresponding to the port 1 by signals on lines corresponding to the ports 2, 3 and 4 are separately determined, and sequentially are: U_dl(1,2), U_dl(1,3), and U_dl(1,4).

When the port i is activated at a second historical moment T2, five other ports 4, 5, 6, 7 and 8 are activated at the same time, and ports 2 and 3 are not activated. Then, power values of downlink FEXT caused to the signal on the line corresponding to the port 1 by signals on lines corresponding to the ports 5, 6, 7 and 8 are separately determined, and sequentially are: U_dl(1,5), U_dl(1,6), U_dl(1,7), and U_dl(1,8). For the port 4, a power value U'_dl(1,4) of downlink FEXT caused to the signal on the line corresponding to the port 1 by a signal on a line corresponding to the port 4 may be redetermined, and a final power value of downlink FEXT caused to the signal on the line corresponding to the port 1 by the signal on the line corresponding to the port 4 is determined according to the power values of downlink FEXT caused to the signal on the line corresponding to the port 1 by the signal on the line corresponding to the port 4 that are separately obtained at the moment T1 and moment T2 (for example, an average value, a maximum value, or the like of the two FEXT power values is obtained). Alternatively, a power value of downlink FEXT caused to the signal on the line corresponding to the port 1 by the signal on the line corresponding to the port 4 at the moment T2 is no longer calculated, and only the value obtained at the moment T1 is used as a final power value of downlink FEXT caused to the signal on the line corresponding to the port 1 by the signal on the line corresponding to the port 4.

So far, downlink FEXT caused to the signal on the line corresponding to the port 1 by the signals on the lines corresponding to all other ports is determined. Optionally, before downlink receive power adjustment is performed on the port 1, as long as a related port is activated, power values of downlink FEXT caused to the signal on the line corresponding to the port 1 by the signal on the line corresponding to each of the other ports at multiple moments may be determined. Optionally, similar to the foregoing embodiments in which a final value of downlink FEXT caused to the signal on the line corresponding to the port 1 by the signal on the line corresponding to the port 4 is determined according to the values of downlink FEXT caused to the signal on the line corresponding to the port 1 by the signal on the line corresponding to the port 4 that are obtained at the two moments T1 and T2, for each of the other ports, when multiple power values of downlink FEXT caused to the signal on the line corresponding to the port 1 by a signal on a line corresponding to the port are determined, a final downlink FEXT power value may also be determined according to the method such as obtaining an average value or a maximum value.

It should be noted that, i=1 is used as an example for description herein, but it does not mean that downlink receive power adjustment can be performed only on the port i. Actually, a downlink receive power corresponding to any port may be adjusted. Optionally, downlink receive power adjustment may also be performed on some ports having a relatively high priority. A specific port selection rule may be determined according to an implementation.

S1302: When the port i is activated, because the power value of downlink FEXT caused to the signal on the line corresponding to the port i by the signal on the line corresponding to each of the other ports and the downlink receive power value of the FTU-R corresponding to the port i are already determined in step S1301, in this step, a VCE may determine a downlink virtual power margin VirtualPwr_dl of the port i according to the power value of downlink FEXT caused to the signal on the line corresponding to the port i by the signal on the line corresponding to each of the other ports and the downlink receive power value of the FTU-R corresponding to the port i.

Under a condition that the port i is activated, for example, in a process of activating the port i, step S1302 may be performed to determine the downlink virtual power margin of the port i.

S1303: The VCE sends the determined VirtualPwr_dl to an FTU-O corresponding to the port i.

S1304: The FTU-O corresponding to the port i sends, by using an SOC message, the VirtualPwr_dl to the FTU-R corresponding to the port i.

S1305: The FTU-R corresponding to the port i determines, in subsequent PGA training, an ADC target input power according to formula 2.

In step S1301 and step S1302, the downlink FEXT power value, the downlink receive power value of the FTU-R corresponding to the port i, and the VirtualPwr_dl may be calculated by using the method in example 1 and example 2.

Embodiment 2

In Embodiment 2, a VCE determines an uplink virtual power margin, and sends the uplink virtual power margin to an FTU-O, for the FTU-O to perform uplink receive power adjustment. Herein, the VCE provides N ports that are used to connect to FTU-Os, where N=8.

Figure 14:
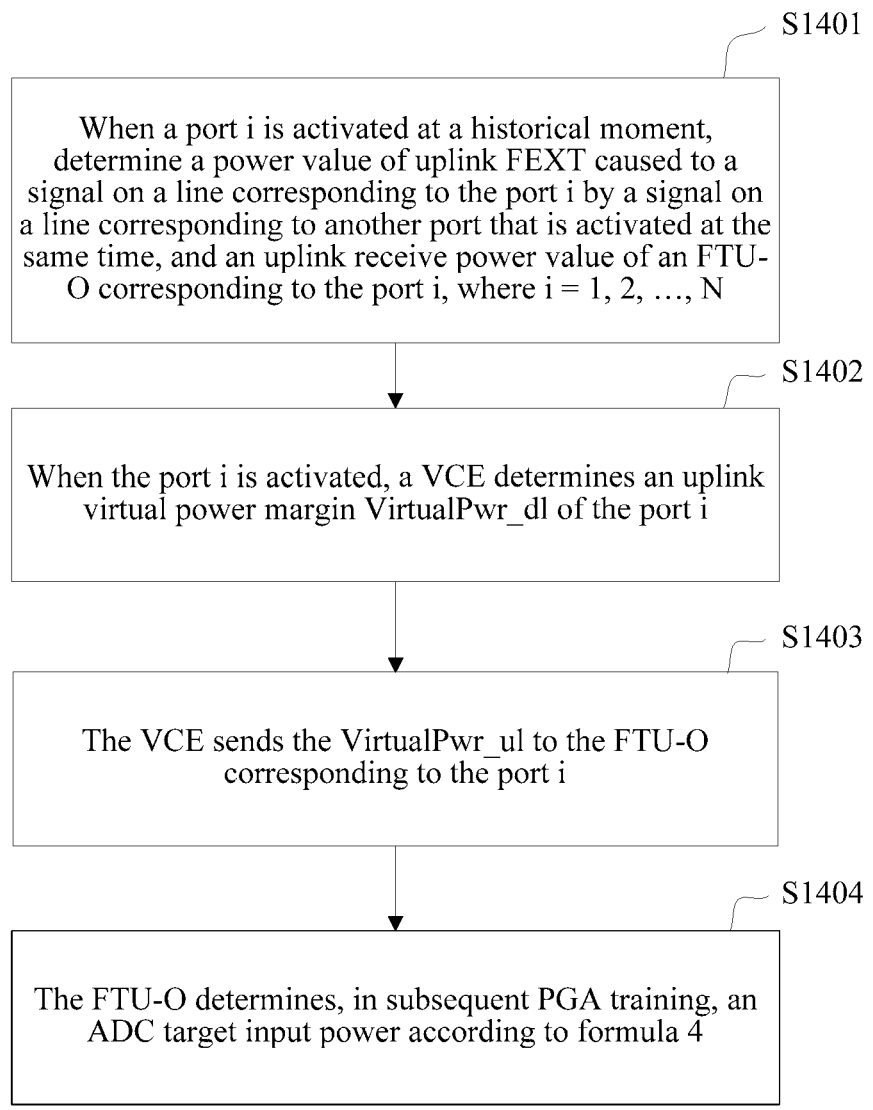
FIG. 14 is a schematic diagram of a process of a method in Embodiment 2.

As shown in FIG. 14, the method of Embodiment 2 includes the following steps:

S1401: When a port i is activated at a historical moment, determine a power value of uplink FEXT caused to a signal on a line corresponding to the port i by a signal on a line corresponding to another port that is activated at the same time, and an uplink receive power value of an FTU-O corresponding to the port i, where i=1, 2, ..., N.

Herein, using a port 1 as an example, when the port i is activated at a first historical moment T1, three other ports 2, 3 and 4 are activated at the same time, and ports 5, 6, 7 and 8 are not activated. Then, power values of uplink FEXT caused to a signal on a line corresponding to the port 1 by signals on lines corresponding to the ports 2, 3 and 4 are separately determined, and sequentially are: U_ul(1,2), U_ul(1,3), and U_ul(1,4).

When the port i is activated at a second historical moment T2, five other ports 4, 5, 6, 7 and 8 are activated at the same time, and ports 2 and 3 are not activated. Then, power values of uplink FEXT caused to the signal on the line corresponding to the port 1 by signals on lines corresponding to the ports 5, 6, 7 and 8 are separately determined, and sequentially are: U_ul(1,5), U_ul(1,6), U_ul(1,7), and U_ul(1,8). For the port 4, a power value U'_ul(1,4) of uplink FEXT caused to the signal on the line corresponding to the port 1 by a signal on a line corresponding to the port 4 may be redetermined, and a final power value of uplink FEXT caused to the signal on the line corresponding to the port 1 by the signal on the line corresponding to the port 4 is determined according to the power values of uplink FEXT caused to the signal on the line corresponding to the port 1 by the signal on the line corresponding to the port 4 that are separately obtained at the moment T1 and moment T2 (for example, an average value, a maximum value, or the like of the two FEXT power values is obtained). Alternatively, a power value of uplink FEXT caused to the signal on the line corresponding to the port 1 by the signal on the line corresponding to the port 4 at the moment T2 is no longer calculated, and only the value obtained at the moment T1 is used as a final power value of uplink FEXT caused to the signal on the line corresponding to the port 1 by the signal on the line corresponding to the port 4.

So far, uplink FEXT caused to the signal on the line corresponding to the port 1 by signals on lines corresponding to all other ports is determined. Optionally, before uplink receive power adjustment is performed on the port 1, as long as a related port is activated, power values of uplink FEXT caused to the signal on the line corresponding to the port 1 by the signal on the line corresponding to each of the other ports at multiple moments may be determined. Optionally, similar to the foregoing description that the final value of uplink FEXT caused to the signal on the line corresponding to the port 1 by the signal on the line corresponding to the port 4 is determined according to the values of uplink FEXT caused to the signal on the line corresponding to the port 1 by the signal on the line corresponding to the port 4 that are obtained at the two moments T1 and T2, for each of the other ports, when multiple power values of uplink FEXT caused to the signal on the line corresponding to the port 1 by a signal on a line corresponding to the port are determined, a final uplink FEXT power value may also be determined according to the method such as obtaining an average value or a maximum value.

It should be noted that, i=1 is used as an example for description herein, but it does not mean that uplink receive power adjustment can be performed only on the port i. Actually, an uplink receive power corresponding to any port may be adjusted. Optionally, uplink receive power adjustment may also be performed on some ports having a relatively high priority. A specific port selection rule may be determined according to an implementation.

S1402: When the port i is activated, because the power value of uplink FEXT caused to the signal on the line corresponding to the port i by the signal on the line corresponding to each of other ports and the uplink receive power value of the FTU-O corresponding to the port i are already determined in step S1401, in this step, a VCE may determine an uplink virtual power margin VirtualPwr_dl of the port i according to the power value of uplink FEXT caused to the signal on the line corresponding to the port i by the signal on the line corresponding to each of the other ports and the uplink receive power value of the FTU-O corresponding to the port i.

Under a condition that the port i is activated, for example, when the port i is just activated, step S1402 may be performed, to determine the downlink virtual power margin of the port i.

S1403: The VCE sends the VirtualPwr_ul to an FTU-O corresponding to the port i.

S1404: The FTU-O determines, in subsequent PGA Training, an ADC target input power according to formula 4.

In step S1401 and step S1402, the uplink FEXT power value, the uplink receive power value of the FTU-O corresponding to the port i, and the VirtualPwr_ul may be calculated by using the method in example 3 or example 4.

Example 1

For a port i, a VCE calculates, according to the following formula, a power value of FEXT caused to a signal on a line corresponding to the port i by a signal on a line corresponding to a port j, and a receive power value of an FTU-R corresponding to the port i:

$$U\_dl(i, j) \frac{\sum_{k \in downlink\ probe\ tone\ number\ set} \left| \sum_{p=1}^{PsLen\_dl} Es\_dl(i, p, k) W\_dl(j, p) \right|^2}{ToneNum\_dl * PsLen\_dl} \quad \text{formula 6}$$

where i, j=1, 2, ..., N, and N is a total quantity of ports; when i is not equal to j, U_dl(i,j) is the power value of downlink FEXT caused to the signal on the line corresponding to the port i by a signal on a line corresponding to the port j, or when i is equal to j, U_dl(i,i) represents a downlink receive power value of the FTU-R corresponding to the port i; Es_dl(i,p,k) is an error amount (which is a vector difference that is between a sampling point and a standard point and determined by a constellation point decider in the FTU-R) reported by the FTU-R corresponding to the port i, W_dl is a downlink pilot sequence, W_dl (j, p) is a pilot value of a downlink pilot whose number is p on the port j, a value of W_dl (j, p) is −1 or 1, and a pilot number p=1, 2, ..., Pslen_dl, where Pslen_dl is a downlink pilot length; k is a number of a downlink probe tone; ToneNum_dl is a quantity of downlink probe tones in a downlink probe tone set, and |.| represents a modulus operation.

For the definition of the pilot W_dl, reference may be made to section 3.9 in document 1 (the protocol ITU-T G.933.5 published in April 2010); and for the definition of the downlink probe tone, reference may be made to the definition in section 3.10 in document 1.

During determining of a downlink virtual power margin, the downlink virtual power margin VirtualPwr_dl(i) of the port i is determined by using the determined U_dl(i,j) according to the following formula, where a unit is dB:

$$\text{VirtualPwr\_dl}(i) = 10 * \log_{10} \left( \frac{\sum_{j=1}^{N} U\_dl(i, j)}{\sum_{j=1,\ and\ j \in a currently\ activated\ port}^{N} U\_dl(i, j)} \right) \quad \text{formula 7}$$

Example 2

For a port i, a VCE calculates, according to the following formula, a power value of downlink FEXT caused to a signal on a line corresponding to the port i by a signal on a line corresponding to a port j, and a receive power value of an FTU-R corresponding to the port i:

$$U\_dl(i, j) \sum_{k \in downlink\ probe\ tone\ number\ set} |P\_dl(i, j, k)|^2 \quad \text{formula 8}$$

where i, j=1, 2, . . . , N, and N is a total quantity of ports; when i is not equal to j, U_dl(i,j) is the power value of downlink FEXT caused to the signal on the line corresponding to the port i by the signal on the line corresponding to the port j, or when i is equal to j, U_dl(i,i) represents the downlink receive power value of the FTU-R corresponding to the port i; when i is not equal to j, P_dl(i, j,k) is a historical coefficient of downlink crosstalk of the port j to the port i, or when i is equal to j, P_dl(i, i,k) is a historical coefficient of downlink crosstalk of the port i to the port i itself; k is a number of a downlink probe tone; and |.| represents a modulus operation.

For the definition of the historical coefficient of downlink crosstalk and a determining method, reference may be made to the definition in appendix III.3 in document 1, where the historical coefficient of downlink crosstalk is a value of each element in a matrix F of formula (III-27) in document 1, where K represents a quantity of currently activated ports.

Then, the VCE determines a downlink virtual power margin VirtualPwr_dl(i) of the port i according to the following formula, where a unit is dB:

$$\text{VirtualPwr\_dl}(i) = 10 * \log_{10}\left(\frac{\sum_{j=1}^{N} U\_dl(i,j)}{\sum_{j=1, \text{and } j \in \text{acurrently activated port}}^{N} U\_dl(i,j)}\right) \quad \text{formula 9}$$

Example 3

For a port i, a VCE calculates, according to the following formula, a power value of uplink FEXT caused to a signal on a line corresponding to the port i by a signal on a line corresponding to a port j, and an uplink receive power value of an FTU-O corresponding to the port i:

$$U\_ul(i,j) \frac{\sum_{k \in \text{downlink probe tone number set}} \left|\sum_{p=1}^{PsLen\_ul} Es\_ul(i,p,k)W\_ul(j,p)\right|^2}{\text{ToneNum\_ul} * \text{PsLen\_ul}} \quad \text{formula 10}$$

where i, j=1, 2, . . . , N, and N is a total quantity of ports; when i is not equal to j, U_dl(i,j) is the power value of uplink FEXT caused to the signal on the line corresponding to the port i by the signal on the line corresponding to the port j, or when i is equal to j, U_dl(i,i) represents the uplink receive power value of the FTU-O corresponding to the port i; Es_ul(i,p,k) is an error amount (which is a vector difference that is between a sampling point and a standard point and determined by a constellation point decider in the FTU-O) reported by the FTU-O corresponding to the port i, W_ul is an uplink pilot sequence, W_ul (j, p) is a pilot value of an uplink pilot whose number is p on the port j, a value of W_ul (j, p) is −1 or 1, and a pilot number p=1, 2, . . . , Pslen_ul, where Pslen_ul is an uplink pilot length; k is a number of an uplink probe tone; ToneNum_ul is a quantity of downlink probe tones in an uplink probe tone set, and |.| represents a modulus operation.

For the definition of the uplink pilot W_dl, reference may be made to section 3.9 in document 1 (the protocol ITU-T G.933.5 published in April 2010); and for the definition of the uplink probe tone, reference may be made to the definition in section 3.10 in document 1.

A downlink virtual power margin VirtualPwr_ul(i) of the port i is determined according to the following formula, where a unit is dB:

$$\text{VirtualPwr\_ul}(i) = 10 * \log_{10}\left(\frac{\sum_{j=1}^{N} U\_ul(i,j)}{\sum_{j=1, \text{and } j \in \text{acurrently activated port}}^{N} U\_ul(i,j)}\right) \quad \text{formula 11}$$

Example 4

For a port i, a VCE calculates, according to the following formula, a power value of uplink FEXT caused to a signal on a line corresponding to the port i by a signal on a line corresponding to a port j, and an uplink receive power value of an FTU-O corresponding to the port i:

$$U\_ul(i,j) \sum_{k \in \text{downlink probe tone number set}} |P\_ul(i,j,k)|^2 \quad \text{formula 12}$$

where i, j=1, 2, . . . , N, and N is a total quantity of ports; when i is not equal to j, U_dl(i,j) is the power value of uplink FEXT caused to the signal on the line corresponding to the port i by the signal on the line corresponding to the port j, or when i is equal to j, U_dl(i,i) represents the uplink receive power value of the FTU-O corresponding to the port i; when i is not equal to j, P_dl(i,j,k) is a historical coefficient of uplink crosstalk of the port j to the port i, or when i is equal to j, P_dl(i,i,k) is a historical coefficient of uplink crosstalk of the port i to the port i itself; k is a number of a downlink probe tone; and |.| represents a modulus operation.

For the definition of the historical coefficient of uplink crosstalk and a determining method, reference may be made to the definition in appendix 111.3 in document 1, where the historical coefficient of uplink crosstalk is a value of each element in a matrix F of formula (III-27) in document 1, where K represents a quantity of currently activated ports.

Then, the VCE determines an uplink virtual power margin VirtualPwr_dl(i) of the port i according to the following formula, where a unit is dB:

$$\text{VirtualPwr\_ul}(i) = 10 * \log_{10}\left(\frac{\sum_{j=1}^{N} U\_ul(i,j)}{\sum_{j=1, \text{and } j \in \text{acurrently activated port}}^{N} U\_ul(i,j)}\right) \quad \text{formula 13}$$

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the exemplary embodiments and all changes and modifications falling within the scope of the present invention.

Obviously, persons skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A vectoring control entity (VCE) providing N ports that are separately used to connect to different transceivers at a subscriber end side of a loop FTU-Rs, the VCE comprising:
   a processor; and
   a memory storing instructions that when executed configure the processor to:
      determine, for a port i in the N ports, when the port i and each port j in the other N−1 ports are activated at the same time, a power value U_dl(i,j) of downlink far end crosstalk (FEXT) of a signal on a line corresponding to the port i caused by a signal on a line corresponding to the port j, and a downlink receive power value U_dl(i,i) of an FTU-R connected to the port i, wherein i, j=1, 2, ..., N, and i is not equal to j;
      when the port i is activated, determine, according to the downlink FEXT power value U_dl(i,j) and the downlink receive power value U_dl(i,i) of the FTU-R corresponding to the port i, a downlink virtual power margin VirtualPwr_dl(i) corresponding to the port i; and
      send the downlink virtual power margin VirtualPwr_dl(i) to the FTU-R connected to the port i, so that the FTU-R connected to the port i performs downlink receive power adjustment according to the downlink virtual power margin VirtualPwr_dl(i),
   wherein the processor is further configured to determine, according to the following formula, the downlink virtual power margin VirtualPwr_dl(i) corresponding to the port i:

$$\text{VirtualPwr\_ul}(i) = 10*\log_{10}\left(\frac{\sum_{j=1}^{N} \text{U\_ul}(i,j)}{\sum_{j=1, \text{and } j \in \text{acurrently activated port}}^{N} \text{U\_ul}(i,j)}\right).$$

2. The VCE according to claim 1, wherein the processor is further configured to:
   determine the downlink FEXT power value U_dl(i,j) and the downlink receive power value U_dl(i,i) according to an error amount reported by the FTU-R connected to the port i,
   wherein the error amount is a difference that is between a standard point vector and a sampling point vector determined by a constellation decider in the FTU-R connected to the port i.

3. The VCE according to claim 1, wherein the processor is further configured to:
   determine the downlink FEXT power value U_dl(i,j) according to a historical coefficient of downlink crosstalk of the port j to the port i, and determine the downlink receive power value U_dl(i,i) according to a historical coefficient of downlink crosstalk of the port i to the port i itself.

4. The VCE according to claim 1 wherein the processor is further configured to:
   add, by using a transceiver at an operator end side of the loop FTU-O connected to the port i, the downlink virtual power margin VirtualPwr_dl(i) to a special operation channel (SOC) message and send the SOC message to the FTU-R connected to the port i.

5. A power adjustment device, comprising a vectoring control entity (VCE) and N transceivers at an operator end side of a loop FTU-Os, wherein the VCE provides N ports that are separately used to connect to different FTU-Os, each of the ports corresponds to one of the FTU-Os, and N is an integer greater than 1; and
   wherein the VCE is configured to:
      for a port i in the N ports, when the port i is activated at a historical moment, determine, when each port j in the other N−1 ports and the port i are activated at the same time, a power value U_ul(i,j) of uplink FEXT caused to a signal on a line corresponding to the port i by a signal on a line corresponding to the port j, and an uplink receive power value U_ul(i,i) of an FTU-O connected to the port i, wherein j=1, 2, . . . , N, and i is not equal to j; and when the port i is activated, determine, according to the uplink FEXT power value U_ul(i,j) and the uplink receive power value U_ul(i,i) of the FTU-O corresponding to the port i, an uplink virtual power margin VirtualPwr_ul(i) corresponding to the port i; and send the uplink virtual power margin VirtualPwr_ul(i) to the FTU-O connected to the port i, so that the FTU-O connected to the port i performs uplink receive power adjustment according to the uplink virtual power margin VirtualPwr_ul(i), wherein the VCE is further configured to determine, according to the following formula, the uplink virtual power margin VirtualPwr_ul(i) corresponding to the port i:

$$\text{VirtualPwr\_dl}(i) = 10 * \log_{10}\left(\frac{\sum_{j=1}^{N} U\_dl(i, j)}{\sum_{j=1, and\ j \subseteq acurrently\ activated\ port}^{N} U\_dl(i, j)}\right).$$

6. The device according to claim 5, wherein the VCE is further configured to:

determine the uplink FEXT power value U_ul(i,j) and the uplink receive power value U_ul(i,i) according to an error amount reported by the FTU-O connected to the port i, wherein the error amount is a difference that is between a sampling point vector and a standard point vector and determined by a constellation decider in the FTU-O connected to the port i.

7. The device according to claim 5, wherein the VCE is further configured to:

determine the uplink FEXT power value U_ul(i,j) according to a historical coefficient of uplink crosstalk of the port j to the port i, and determine the uplink receive power value U_ul(i,i) according to a historical coefficient of uplink crosstalk of the port i to the port i itself.

8. A downlink receive power adjustment method for a port i in N ports that are provided by a vectoring control entity (VCE) and used to connect to transceivers at a subscriber end side of a loop FTU-Rs, the method comprising:

when the port i is activated at a historical moment, determining, when each port j in the other N−1 ports and the port i are activated at the same time, a power value of downlink FEXT U_dl(i,j) caused to a signal on a line corresponding to the port i by a signal on a line corresponding to the port j, and a downlink receive power value U_dl(i,i) of an FTU-R connected to the port i, wherein i, j=1, 2, . . . , N, and i is not equal to j; and when the port i is activated, determining, according to the determined downlink FEXT power value U_dl(i,j) and the determined downlink receive power value U_dl(i,i) of the FTU-R corresponding to the port i, a downlink virtual power margin VirtualPwr_dl(i) corresponding to the port i; and sending the downlink virtual power margin VirtualPwr_dl(i) to the FTU-R connected to the port i, so that the FTU-R connected to the port i performs downlink receive power adjustment according to the downlink virtual power margin VirtualPwr_dl(i), wherein the downlink virtual power margin VirtualPwr_dl(i) corresponding to the port i is determined according to the following formula:

$$\text{VirtualPwr\_ul}(i) = 10 * \log_{10}\left(\frac{\sum_{j=1}^{N} U\_ul(i, j)}{\sum_{j=1, and\ j \subseteq acurrently\ activated\ port}^{N} U\_ul(i, j)}\right).$$

9. The method according to claim 8, wherein the downlink FEXT power value U_dl(i, j) and the downlink receive power value U_dl(i,i) are determined according to an error amount reported by the FTU-R connected to the port i, and wherein the error amount is a difference that is between a sampling point vector and a standard point vector and determined by a constellation decider in the FTU-R connected to the port i.

10. The method according to claim 8, wherein the downlink FEXT power value U_dl(i,j) is determined according to a historical coefficient of downlink crosstalk of the port j to the port i, and the downlink receive power value U_dl(i,i) is determined according to a historical coefficient of downlink crosstalk of the port i to the port i itself.

11. The method according to claim 8, wherein the sending the downlink virtual power margin VirtualPwr_dl(i) to the FTU-R connected to the port i comprises:

adding, by using a transceiver unit at the side of the operator end of the loop FTU-O connected to the port i, the downlink virtual power margin VirtualPwr_dl(i) to a special operation channel SOC message and sending the SOC message to the FTU-R connected to the port i.

12. An uplink receive power adjustment method for a port i of N ports that are provided by a vectoring control entity (VCE) and used to connect to transceivers at an operator end side of the loop FTU-Os, the method comprising:

when the port i is activated at a historical moment, determining, when each port j in the other N−1 ports and the port i are activated at the same time, a power value U_ul(i,j) of uplink FEXT caused to a signal on a line corresponding to the port i by a signal on a line corresponding to the port j, and an uplink receive power value U_ul(i,i) of an FTU-O connected to the port i, wherein i, j=1, 2, . . . , N, and i is not equal to j;

when the port i is activated, determining, according to the determined uplink FEXT power value U_ul(i,j) and the determined uplink receive power value U_ul(i,i) of the FTU-O corresponding to the port i, an uplink virtual power margin VirtualPwr_ul(i) corresponding to the port i; and sending the uplink virtual power margin VirtualPwr_ul(i) to the FTU-O connected to the port i, so that the FTU-O connected to the port i performs uplink receive power adjustment according to the uplink virtual power margin VirtualPwr_ul(i), wherein the uplink virtual power margin VirtualPwr_ul(i) corresponding to the port i is determined according to the following formula:

$$\text{VirtualPwr\_ul}(i) = 10 * \log_{10}\left(\frac{\sum_{j=1}^{N} U\_ul(i, j)}{\sum_{j=1, and\ j \subseteq acurrently\ activated\ port}^{N} U\_ul(i, j)}\right).$$

13. The method according to claim 12, wherein the uplink FEXT power value U_ul(i,j) and the uplink receive power value U_ul(i,i) are determined according to an error amount reported by the FTU-O connected to the port i, and
 wherein the error amount is a difference that is between a sampling point vector and a standard point vector and determined by a constellation decider in the FTU-O connected to the port i.

14. The method according to claim 12, wherein the uplink FEXT power value U_ul(i,j) is determined according to a historical coefficient of uplink crosstalk of the port j to the port i, and the uplink receive power value U_ul(i,i) is determined according to a historical coefficient of uplink crosstalk of the port i to the port i itself.

* * * * *